United States Patent [19]

Tigerholm

[11] Patent Number: 5,400,814

[45] Date of Patent: Mar. 28, 1995

[54] METHOD FOR BLOCKING A PIPE AND DEVICE THEREFOR

[75] Inventor: Lars Tigerholm, Bromma, Sweden

[73] Assignee: Tigerholm AB, Ekero, Sweden

[21] Appl. No.: 246,752

[22] Filed: May 20, 1994

[30] Foreign Application Priority Data

May 26, 1993 [SE] Sweden ........................... 9301793

[51] Int. Cl.[6] .................. F16K 43/00; F16L 55/12
[52] U.S. Cl. ........................ 137/15; 137/318;
   138/93; 138/94; 138/97; 30/94; 83/54; 83/745
[58] Field of Search ............... 138/93, 94, 97; 137/15,
   137/315, 317, 318; 30/94, 95; 83/54, 745

[56] References Cited

U.S. PATENT DOCUMENTS

| | | | |
|---|---|---|---|
| 1,946,138 | 2/1934 | Gardner | 138/93 |
| 3,240,227 | 3/1966 | Burkholder | 137/318 |
| 3,805,844 | 4/1974 | Bacon | 138/93 |
| 4,127,141 | 11/1978 | Ledonne et al. | 137/15 |
| 4,155,373 | 5/1979 | DiGiovanni | 137/15 |
| 4,949,744 | 8/1990 | Heed et al. | 137/318 |

FOREIGN PATENT DOCUMENTS 3637207 5/1988 Germany .
460073 9/1989 Sweden .
464727 6/1991 Sweden .

Primary Examiner—George L. Walton
Attorney, Agent, or Firm—Walter Ottesen

[57] ABSTRACT

A device blocks the flow of fluid in a pipe so that work can be done on the pipe downstream of the device. The device includes an installation unit and a blocking unit. The installation unit is sealed against the ambient when mounted on the pipe to permit drilling a hole into the pipe and the blocking unit includes an expandable body which is passed through the installation unit and on through the hole in order to temporarily block the flow of fluid in the pipe. The expandable body has a larger diameter than the internal diameter of a channel in the installation unit. The blocking unit includes a rod mounted in the holder to which a manual force is applied for distending the expandable body before insertion so that the expandable body has a diameter less than the diameters of both the channel and the hole thereby facilitating passage of the expandable body through the channel and hole into the pipe. The manual force is released and the rod is then withdrawn so that the expandable body assumes its initial shape within the pipe. Air under pressure can be applied to the expandable body so that the body tightly plugs the pipe thereby permitting work to be done on the pipe.

9 Claims, 2 Drawing Sheets

FIG. 3
FIG. 4
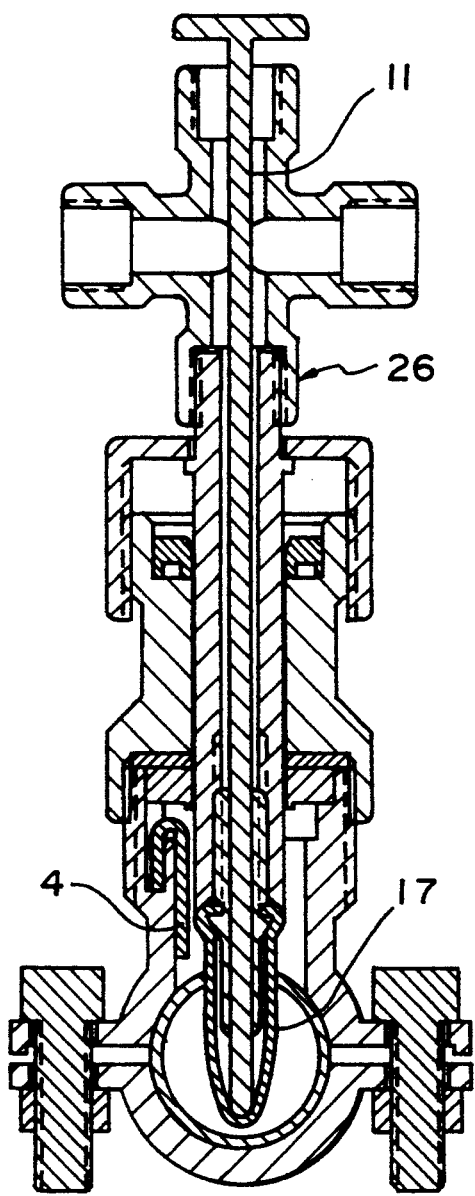
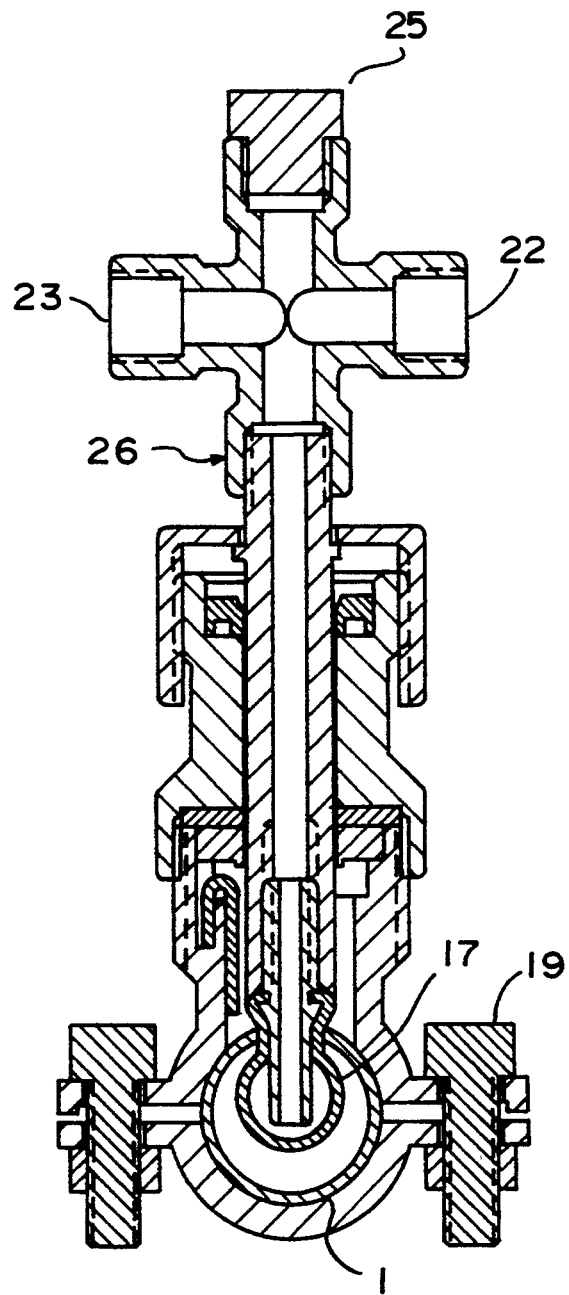

METHOD FOR BLOCKING A PIPE AND DEVICE THEREFOR

FIELD OF THE INVENTION

The invention relates to a method and a device for blocking the flow of a fluid in a pipe. The drive includes an installation unit sealed against the ambient when mounted on the pipe. A hole is drilled into the pipe through this installation unit with the drilling tool sealed with respect to the ambient. An expandable body is mounted on a holder and is introduced through the installation unit and through the hole drilled in the pipe to temporarily block the flow of fluid in the pipe. The expandable body has a larger diameter before insertion than both the internal diameter of the channel in the installation unit and the diameter of the drilled hole.

BACKGROUND OF THE INVENTION

Prior art methods and devices for temporarily blocking the flow of fluid in a pressurized pipe with retained sealing relative to the ambient are disclosed, for example, in Swedish patent publication 8605208-1. In these devices, the external diameter of the expandable body, in the form of a cylindrical rubber balloon attached to the blocking unit, has a specific maximum size in relation to the internal diameter of the pipe to be blocked because of practical limitations in the ability of the balloon to expand. This is a major disadvantage, since a plurality of different dimensions are required for the installation unit, blocking unit and rubber balloon to accommodate pipes of different sizes. Another major disadvantage is that when the blockage of, for example, two inch pipes or larger is involved, the blocking unit, drill and rubber balloon must be so large that hand drills can no longer be used to make the hole in the pipe, and large, stand-mounted power drills become necessary. Since the pipes in question are often water and heating pipes mounted near walls in buildings, the lack of space rules out the use of drills of the requisite size.

The prior art method is only intended for temporarily blocking the flow in a pipe and the expandable body is removed after blocking.

Another disadvantage with respect to the prior art method is that the shape of the expandable body changes after a period of time in the inflated state so that the balloon is unable to fully assume its original shape. Its external diameter is then larger than the hole in the pipe-through which the expandable body is to be removed. This means that the expandable body could detach from the blocking unit during removal and get left behind in the pipe.

SUMMARY OF THE INVENTION

It is an object of the invention to provide a method and a device which eliminate the aforesaid disadvantages and which minimize the diameter of the blocking unit and the drill required and, thus, minimize the diameter of the hole needed in the pipe.

The invention is a device for temporarily blocking the flow of fluid under pressure through a pipe having an annular wall defining an outer surface. The device comprises: an installation unit including: a base structure defining a through channel having an inner diameter and communicating with the outer surface of the pipe; the base structure further defining an opening to the channel to facilitate inserting a tool into the channel for making a hole in the wall of the pipe; attachment means for attaching the base structure to tile pipe so as to provide a seal between the base structure and the outer surface of the pipe; and, sealing means for sealing the channel with respect to the ambient when the tool is inserted; a blocking unit including: a holder defining a longitudinal axis and having an end; an expandable body mounted on the end and being expandable to have an expanded diameter greater than the inner diameter of the pipe; and, axial distender means mounted on the holder to axially distend the expandable body so as to cause the expandable body to become elongated and to have a diameter less than the diameter of the hole and less than the inner diameter of the channel thereby permitting the expandable body to be insertted through the channel and the hole and into the pipe whereupon the axial distender means is released so that the expandable body can again assume its initial shape to thereby block the flow of fluid through the pipe; and, the installation unit further including valve means mounted in the base structure and being movable between a first position wherein the channel is closed to the ambient and a second position wherein the channel is open to permit insertion of the tool and of the expandable body.

When the expandable body, usually a rubber balloon, is pear-shaped instead of cylindrical with a maximum diameter larger than the hole made in the pipe, the expandable body does not need to expand to as great a degree in order to fill the internal diameter of the pipe completely and only one expandable body size can be used for a larger number of pipe diameters than has previously been possible.

Insertion of the expandable body with a diameter larger than the hole drilled is made possible when this body, which is attached to the blocking unit, is forced to distend or expand axially before insertion into the installation unit and on into the pipe thereby reducing its maximum diameter to a size less than the diameter of the channel in the installation unit and the diameter of the hole in the pipe. After the expandable body has been partially inserted into the pipe, its axial expansion is gradually reduced thereby causing the expandable body to assume its original pear shape. Once the expandable body is placed in the pipe, blockage of the flow of fluid can be accomplished by internally pressurizing the expandable body until it is adequately pressurized to completely block the pipe.

Work can now be performed on the pipe at a location downstream of the location whereat the installation unit is attached to the pipe.

When the expandable body is subsequently removed from the pipe, the reverse procedure is followed after internal pressure in the expandable body has been reduced to atmospheric pressure. That is, the expandable body is again made to expand axially until its outer diameter is less than the diameter of the hole in the pipe thereby permitting the blocking unit with the expandable body to be removed.

BRIEF DESCRIPTION OF THE DRAWINGS

The invention will now be described with reference to the drawings wherein:

FIG. 3 is a section view taken through the installation unit and blocking unit showing the axially expanded expandable body being inserted through the hole in the pipe; and, FIG. 4 shows the expandable body fully inserted into the pipe but no longer axially expanded and before being expanded with pressurized air to block the pipe.

DESCRIPTION OF THE PREFERRED EMBODIMENTS OF THE INVENTION

Figure 1:
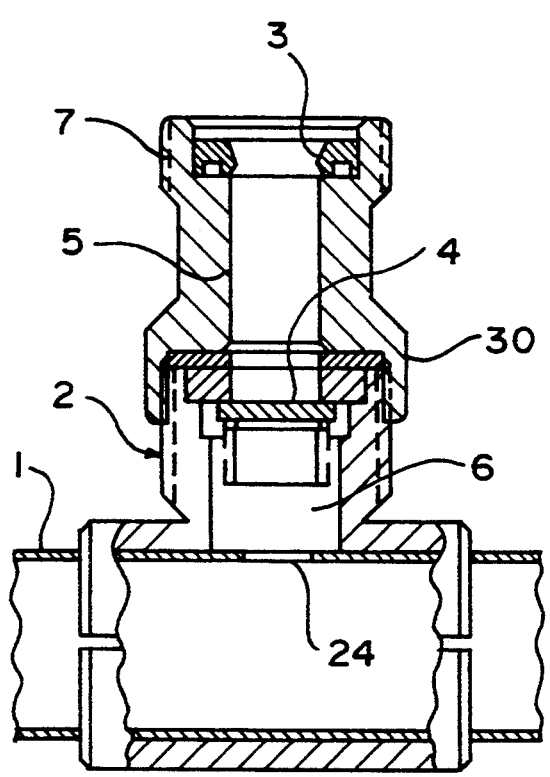
FIG. 1 is a side elevation view, partially in section, of an installation unit of the device of the invention mounted on a pipe.

In FIG. 1, reference numeral 1 identifies a part of the pipe in which the flow is to be blocked and reference numeral 2 identifies an installation unit of the device of the invention. The installation unit 2 is clamped around the pipe with threaded fasteners 19 (FIG. 4) to provide a seal with respect to the ambient. A sealing body 3 first seals against a drill (not shown) used for drilling a hole 24 in the pipe and then seals against the blocking unit 26 when the blocking unit is inserted into the installation unit 2. The installation unit 2 has a through channel 5 which guides the drill when making tile hole 24 in the pipe 1 and later guides the blocking unit 26 shown in FIG. 2. A valve device in the form of a flap seal 4 made of rubber is acted on by tile drill to open when inserted into the installation unit 2 and then by the blocking unit 26, which, due to its elasticity and the pressure in the pipe, automatically closes when the drill or blocking unit is removed. The installation unit 2 has a cavity 6 to provide space for the pivot movement of the flap seal 4 and to collect drill cuttings formed during hole drilling. Finally, an external thread 7 is provided on the upper part of the installation unit 2 for threadably attaching the blocking unit thereto with the nut 9.

Figure 2:
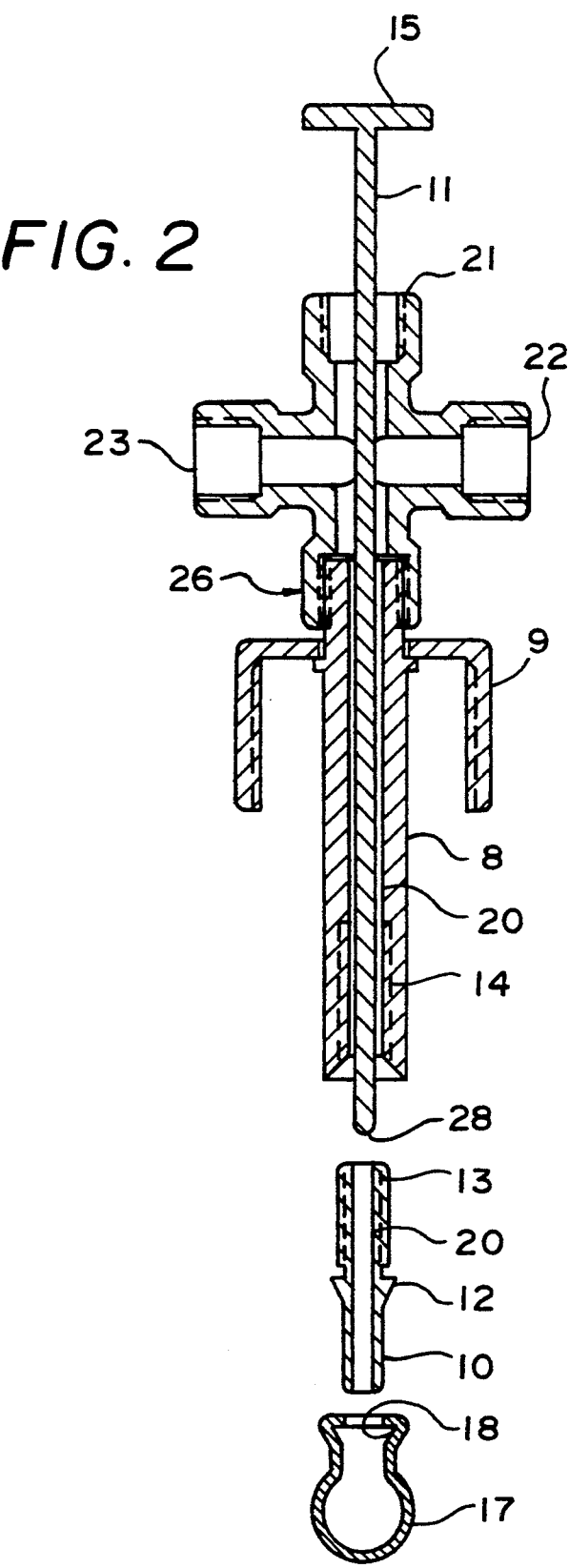
FIG. 2 shows a disassembled blocking unit with its upper portion and lower portion including the unmounted expandable body.

FIG. 2 shows the blocking unit 26 whose upper part 8 and lower part 10 are provided with a center channel 20 permitting axial movement of the expander rod 11 and allowing compressed air to be supplied to the expandable body 17. Moreover, the upper part 8 is provided with three threaded connecting portions, namely: connecting portion 21 for inserting the expander rod 11, connecting portion 22 for connecting a compressed air supply and connecting portion 23 for connecting a pressure gauge. The nut 9 is provided for threadably attaching the blocking unit 26 to the external thread 7 of installation unit 2. An internal thread 14 corresponding to the thread 13 on the lower part 10 is provided for attaching the expandable body 17. The lower part 10 is also equipped with a collar 12 which ensures retention of the expandable body 17 by gripping an internal lip 18 formed on the expandable body. Finally, the lower portion of the rod 11 is rounded at 28 and acts internally on the body 17 to axially expand the latter when a force is applied manually to the pressure plate 15. The expandable body 17 is further shown here as a pear-shaped balloon.

FIG. 3 shows the blocking unit 26 with the expandable body 17 attached and forced to axially expand by the rod 11 thereby enabling the expandable body to be inserted into the channel 5 of the installation unit 2 and on into the hole 24 drilled in the pipe 1.

In FIG. 4, the expandable body 17 is shown positioned in the pipe 1, where it has again assumed its pear shape after the manual force has been removed from the rod 11. The rod 11 has been entirely withdrawn in FIG. 4. The expandable body 17 can now be expanded with, for example, compressed air fed in through the connecting portion 22 in order to expand the body 17 and block the pipe completely. The connecting portion 21 is plugged with a plug 25 and the connecting portion 23 is connected to a pressure gauge (not shown).

After work on the pipe 1 has been completed downstream of the location where the installation unit 2 has been installed, the expandable body 17 is withdrawn from the pipe 1 and the blocking unit 26 is threadably disengaged from the installation unit 2. Thereafter, the connector 30 is threadably disengaged from the installation unit 2 and replaced by a simple threaded cap (not shown). The cap and installation unit 2 then remain on the pipe 1 to serve as a permanent closure for the hole 24.

It is understood Lhat the foregoing description is that of the preferred embodiments of the invention and that various changes and modifications may be made thereto without departing from the spirit and scope of the invention as defined in the appended claims.

What is claimed is:

1. A device for temporarily blocking the flow of fluid under pressure through a pipe having an annular wall defining an outer surface, the device comprising:

an installation unit including: a base structure defining a through channel having an inner diameter and communicating with the outer surface of the pipe; the base structure further defining an opening to said channel to facilitate inserting a tool into said channel for making a hole in the wall of the pipe; attachment means for attaching said base structure to said pipe so as to provide a seal between said base structure and the outer surface of the pipe; and, sealing means for sealing said channel with respect to the ambient when the tool is inserted;

a blocking unit including: a holder defining a longitudinal axis and having an end; an expandable body mounted on said end and being expandable to have an expanded diameter greater than the inner diameter of the pipe; and, removable axial distender means mounted on said holder to axially distend said expandable body so as to cause said expandable body to become elongated and to have a diameter less than the diameter of said hole and less than said inner diameter of said channel thereby permitting said expandable body to be inserted through said channel and said hole and into said pipe whereupon said axial distender means is removed from said expandable body so that said expandable body can again assume its initial shape within said pipe to thereby block the flow of fluid through the pipe when pressurized fluid means is injected into said expandable body; and, said installation unit further including valve means mounted in said base structure and being movable between a first position wherein said channel is closed to the ambient and a second position wherein said channel is open to permit insertion of the tool and of said expandable body.

2. The device of claim 1, said holder being an elongated member defining a through passage and having said end; said releasable axial distender means being a rod movably mounted in said through passage and said rod having a length greater than said holder so as to extend downwardly into said expandable body to distend said expandable body when said rod is manually pushed downwardly in said holder thereby facilitating the insertion of said expandable body through said channel and the hole and into the pipe.

3. The device of claim 2, said blocking unit further including mounting means for securely mounting said expandable body to said end of said holder.

4. The device of claim 3, said expandable body having an opening; and, said mounting means comprising: a threaded piece threadably engaging said rod and having a collar formed thereon; and, an internal lip formed on said expandable body at said opening thereof for engaging said collar and holding said expandable body tightly on said holder when said expandable body is distended for insertion into the pipe and later withdrawn therefrom when pressurized fluid means is injected into said expandable body.

5. The device of claim 4, said rod having an upper end with a plate formed thereon at said upper end to facilitate manually pushing said rod in said holder to distend said expandable body and said rod having a lower end which is rounded to prevent piercing said expandable body when distending the same.

6. The device of claim 2, said base structure having a cavity formed therein along said channel; and, said valve means being a flap valve mounted in said cavity.

7. The device of claim 2, further comprising compressed gas supply means formed in said holder for conducting gas under pressure into said expandable body after said expandable body is in position within the pipe.

8. The device of claim 2, said expandable body having a pear shape configuration.

9. A method for temporarily blocking the flow of fluid under pressure through a pipe having an annular wall defining an outer surface, the method comprising the steps of:

fixedly attaching a base structure to the pipe at a location thereon downstream of where work is to be performed on the pipe;

inserting a tool into a channel of the base structure for making a hole in the annular wall of the pipe;

opening a normally closed valve in the base structure when inserting the tool to open the channel;

providing a seal in said channel for sealing the channel with respect to the ambient when the tool is inserted;

withdrawing the tool after the hole is made thereby allowing said valve to return to the normally closed position wherein said channel is closed with respect to the ambient;

providing a blocking unit which includes: a holder defining a longitudinal axis and having an end; and, an axial distender mounted on said holder;

imparting a manual force to the axial distender to axially distend the expandable body so as to cause said expandable body to become elongated and to have a diameter less than the diameter of said channel and less than the diameter of the hole;

inserting said holder and said expandable body into said channel to pass said expandable body through said channel and the hole and into the pipe while distended thereby again opening said normally closed valve while at the same time utilizing said seal to seal said channel from the ambient;

removing said manual force from said axial distender so that said expandable body can again assume its initial shape within said pipe to thereby block the flow of fluid through the pipe when pressurized fluid means is injected into said expandable body;

after work on the pipe is completed, again utilizing said axial distender to axially distend the expandable body so that said expandable body can be easily removed from said pipe and through said hole; and, utilizing said holder to withdraw said expandable body from said pipe through the hole and said channel thereby causing said valve to again assume said normally closed position.

* * * * *

UNITED STATES PATENT AND TRADEMARK OFFICE
CERTIFICATE OF CORRECTION

PATENT NO. : 5,400,814
DATED : March 28, 1995
INVENTOR(S) : Lars Tigerholm

It is certified that error appears in the above-indentified patent and that said Letters Patent is hereby corrected as shown below:

In column 1, line 49: delete "pipe-through" and substitute -- pipe through -- therefor.

In column 2, line 1: delete "tile" and substitute -- the -- therefor.

In column 2, line 14: delete "insertted" and substitute -- inserted -- therefor.

In column 3, line 21: delete "tile" and substitute -- the -- therefor.

In column 3, line 24: delete "tile" and substitute -- the -- therefor.

In column 4, line 13: delete "Lhat" and substitute -- that -- therefor.

In column 4, line 57: between "open" and "to", insert -- by said tool and said expandable body --.

UNITED STATES PATENT AND TRADEMARK OFFICE
CERTIFICATE OF CORRECTION

PATENT NO. : 5,400,814
DATED : March 28, 1995
INVENTOR(S) : Lars Tigerholm

It is certified that error appears in the above-indentified patent and that said Letters Patent is hereby corrected as shown below:

In column 5, lines 12 and 13: delete "when pressurized fluid means is injected into said expandable body".

Signed and Sealed this

Sixth Day of June, 1995

Attest:

BRUCE LEHMAN

Attesting Officer

Commissioner of Patents and Trademarks